Figure 1:
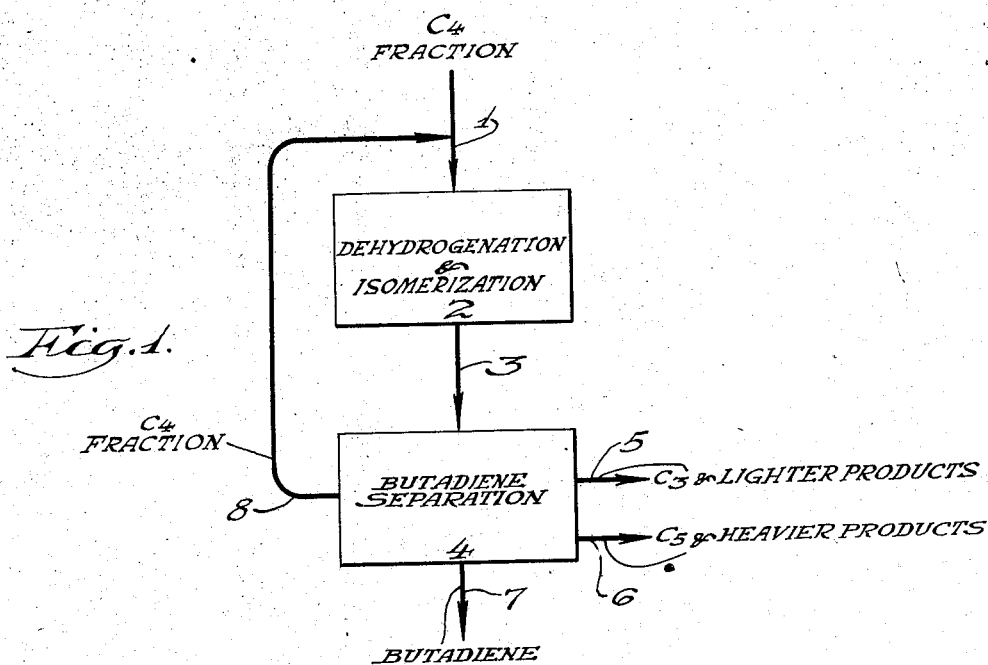

June 19, 1945.  W. J. MATTOX  2,378,650

MANUFACTURE OF BUTADIENE

Filed Feb. 11, 1942

Inventor:
William J. Mattox
By Lee J. Gary
Attorney.

Patented June 19, 1945

2,378,650

UNITED STATES PATENT OFFICE 2,378,650

MANUFACTURE OF BUTADIENE

William J. Mattox, Chicago, Ill., assignor to Universal Oil Products Company, Chicago, Ill., a corporation of Delaware Application February 11, 1942, Serial No. 430,500

11 Claims. (Cl. 260—680)

This is a continuation-in-part of my co-pending application Serial No. 348,976, filed July 31, 1940.

This invention relates to a process for the manufacture of butadiene from $C_4$ fractions. More specifically, it is concerned with a method for converting mixed $C_4$ hydrocarbons, both normal and iso, into high yields of butadiene by a combination of isomerization and dehydrogenation.

The production of synthetic rubber is dependent primarily upon processes for the production of butadiene and styrene since these two chemicals are the principal raw materials for the production of rubber. Therefore, processes which can produce butadiene from abundant and cheap charging materials are very much in need at the present time. Butadiene is most commonly made by the dehydrogenation of normal $C_4$ hydrocarbons in the presence of a catalyst. Whenever isobutane and isobutene are present in appreciable quantities, and are allowed to build up in the system by recycling, carbon formation becomes excessive since these iso compounds will not dehydrogenate directly to butadiene. For this reason, it has been necessary to reduce the iso fraction of the $C_4$ hydrocarbon charge to a low value in order to prevent buildup.

I have found that by combining isomerization with dehydrogenation, butadiene can be produced with high yields from the ordinary $C_4$ fraction present in a refinery gas, natural gas, or the like. According to my process, the isobutene originally present in the charge or produced by the dehydrogenation of isobutane in the dehydrogenation step is isomerized by a highly active catalyst comprising hydrous silica composited with hydrous alumina or hydrous zirconia. The resulting normal butenes are then readily dehydrogenated to butadiene. By this process, a higher ultimate yield of butadiene may be obtained from an average $C_4$ fraction than from the conventional operation since iso $C_4$ hydrocarbons are also converted to butadiene. Furthermore, an expensive prefractionation step employed in the conventional operation to separate iso from normal $C_4$ hydrocarbons is eliminated.

There are two ways in general in which my process may be operated. In the first method, a composite $C_4$ fraction is subjected to dehydrogenation with subsequent production of butadiene. Following the separation of the butadiene from the reaction products, the remaining $C_4$ hydrocarbons are contacted with an isomerization catalyst at temperatures capable of effecting isomerization of a substantial part of the isobutene to normal butene. The resulting product of isomerization containing a large proportion of normal butenes is then commingled with the original charging stock and the composite material again subjected to dehydrogenation to produce butadiene and more butenes.

Alternatively, the isomerization and dehydrogenation reactions may be effected in the same zone by employing catalysts which have not only dehydrogenating properties but also olefin isomerizing properties. The butadiene thus formed may then be separated from the reaction products and the remaining $C_4$ butanes and butenes returned to the dehydrogenating-isomerizing zone together with the raw feed to produce more butadiene.

In one specific embodiment the present invention relates to a process for the production of butadiene from a $C_4$ fraction composed of normal and iso $C_4$ hydrocarbons which comprises contacting said fraction together with a second $C_4$ fraction obtained as hereinafter set forth with a dehydrogenating catalyst at conditions suitable for the production of butadiene therefrom, recovering butadiene from the products of dehydrogenation, subjecting the remaining $C_4$ hydrocarbons to an isomerizing treatment whereby a substantial portion of the isobutene contained therein is converted to normal butenes, and thereafter returning the isomerized $C_4$ fraction to the dehydrogenation treatment as said second $C_4$ fraction.

Figure 2:
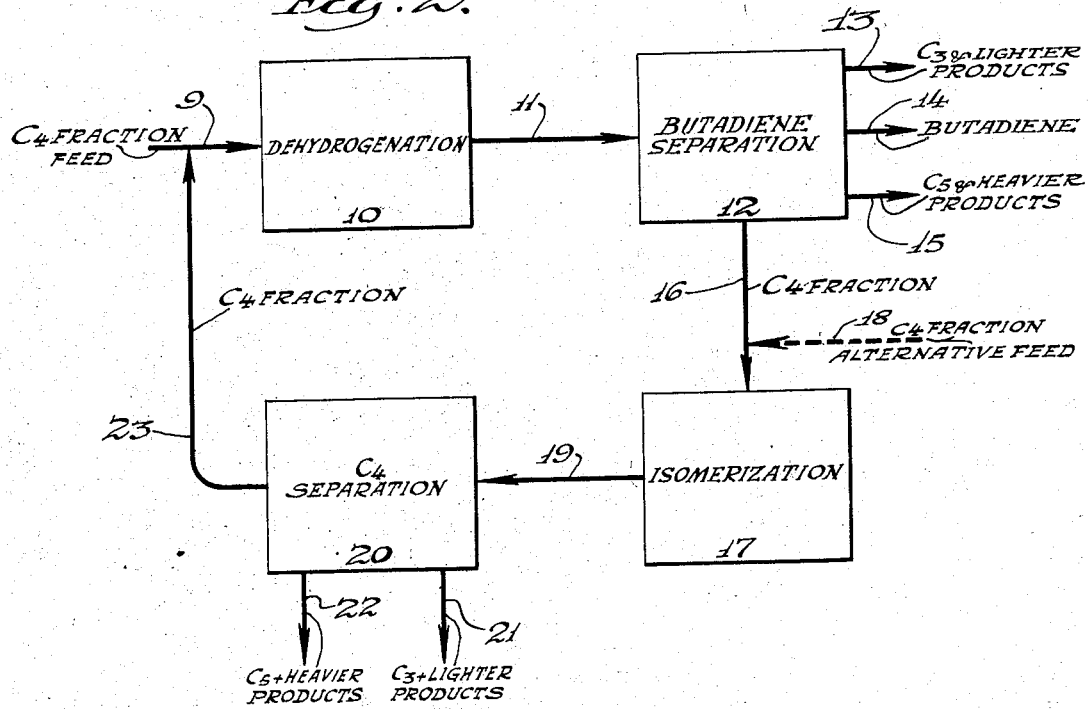

The accompanying drawing illustrates schematically two process flows which may be employed in accomplishing the objects of this invention. Figure 1 of the drawing illustrates a one stage operation in which isomerization and dehydrogenation are effected in the same zone and Figure 2 illustrates a two stage operation in which dehydrogenation and isomerization are effected in separate zones.

Referring now to Figure 1 of the drawing, a $C_4$ fraction which consists not only of normal $C_4$ hydrocarbons but also iso $C_4$ hydrocarbons is supplied through line 1 to dehydrogenation and isomerization zone 2 where it is contacted with a catalyst at a temperature usually within the range of from about 100–1300° F. at conditions suitable for effecting simultaneous dehydrogenation and isomerization. It is necessary in this zone in order to prevent excess decomposition of the butadiene to maintain a hydrocarbon partial pressure of less than 1 atmosphere, preferably of less than about 300 mm. mercury absolute. It is also desirable to employ relatively short contact times in this zone since in this manner, the butadiene which is formed, is not decomposed to secondary reaction products. The reaction may be conducted by passing the hydrocarbon vapors through a bed of granular catalyst, or it may be effected by flowing the hydrocarbon charge upward through a turbulent bed of powdered catalyst, the catalyst being kept in suspension by the upward flow of hydrocarbons therethrough. It is usually necessary also to provide some means of supplying heat to the dehydrogenation zone proper since the dehydrogenation reaction is strongly endothermic.

Catalysts which have been found suitable in effecting dehydrogenation include oxides of the metals of the left hand columns of groups IV, V and VI of the periodic table deposited on refractory supports. Usually the oxides of chromium, molybdenum, and vanadium deposited on alumina have been found to be superior. The preferred olefin isomerizing catalyst is a composite comprising a calcined precipitate of hydrous silica and hydrous alumina. Other suitable olefin isomerizing catalysts which have as their principal component an alkali free hydrous silica may also be employed and will be described more fully later.

Several alternative methods of operation may be used in the catalytic zone. In case an operation is employed in which the hydrocarbons are passed through a fixed bed of catalyst, several alternative methods of disposing the catalyst within the reaction zone may be employed. For example, the catalysts may be deposited in alternate layers throughout the depth of the bed, or the granules may be physically admixed so that a uniform distribution of both catalysts is obtained throughout the zone. On the other hand, it may be desirable to deposit the dehydrogenating oxide such as chromium oxide upon the isomerizing catalyst as a support. It is seen, therefore, that various methods may be employed for dispersing both catalysts throughout the reaction zone.

When powdered catalysts are used in the manner previously mentioned, either a mixture of powdered dehydrogenating catalyst with a powdered isomerizing catalyst may be employed or the dehydrogenating oxide may be deposited upon the silica alumina hydrogel isomerizing catalyst, thereby producing a catalyst which will effect both reactions.

The products from catalytic zone 2 are then supplied through line 3 to butadiene separation zone 4 wherein a separation is effected between butadiene on the one hand and a $C_4$ fraction on the other. Also separated in this zone are a light fraction comprising $C_3$ and lighter products and a heavy fraction comprising $C_5$ and heavier products. The butadiene separation step ordinarily consists not only of the necessary absorbers and stripper to make a separation between the $C_3$, $C_4$, $C_5$, fractions, but also of a distillation step or solvent extraction step, to make an efficient separation between butadiene and the other $C_4$ hydrocarbons. At any rate, only the overall effect is shown on the drawing, $C_3$ being recovered through line 5, $C_5$ through line 6, butadiene through line 7; and the remaining $C_4$ fraction through line 8. The latter fraction is then returned to dehydrogenation and isomerization zone 2 for further treatment.

Referring now to Figure 2 of the drawing, the $C_4$ fraction feed is supplied through line 9 to dehydrogenation zone 10 wherein it is contacted with a dehydrogenation catalyst to produce butenes and butadiene. In this zone, groups IV, V and VI oxide catalysts may be used but the preferred catalysts comprise chromia, molybdena, or vanadia on refractory supports. Temperatures in this zone range generally from 1000 to 1300° F., and hydrocarbon partial pressures of less than 300 mm. mercury absolute are preferred. As in zone 2, either a granular catalyst in a fixed bed or a powdered catalyst in a turbulent bed may be employed. The products of dehydrogenation are supplied through line 11 to butadiene separation zone 12, similar to butadiene separation zone 4 previously described in which a $C_3$ and lighter fraction, a butadiene fraction, a $C_5$ and heavier fraction, and a remaining $C_4$ fraction are separated. The first 3 fractions are recovered through lines 13, 14 and 15 respectively while the last named fraction is supplied through line 16 to isomerization zone 17 wherein isomerization of the isobutene to normal butenes is effected. It should be noted that alternatively the fresh feed may be supplied to this point through line 18 in order to effect isomerization of the isobutene contained therein before subjecting the feed to a dehydrogenation reaction, unless the feed contains a high concentration of isobutene. However, the preferred introduction of the feed is through line 9.

Isomerization zone 17 may be of the fixed bed type employing granular catalyst or of the fluid bed type employing powdered catalyst both of which types were previously mentioned in connection with zones 2 and 10. The temperatures in this zone range from approximately 750 to 1150° F. or higher, although the preferred temperatures are of the order of about 1000° F. In order to maintain effective isomerization of isobutene to normal butene, it is essential that the basic constituent of the catalyst which is employed in this zone be a hydrous silica combined with either hydrous alumina, hydrous zirconia or both, to produce a highly active catalytic mass that is thermally stable even at high temperatures. These synthetic catalysts may be prepared by forming a composite mass of silica hydrogel and alumina or zirconia hydrogel, followed by drying and calcining at 800–1500° F. It has been found that naturally occurring composites of silica and alumina are not satisfactory for effecting the isomerization reaction and, furthermore, they are less thermally stable.

Isomerization products from zone 17 are supplied through line 19 to $C_4$ separation zone 20 wherein a separation is effected between $C_3$ and lighter products, a $C_4$ fraction, and $C_5$ and heavier products. The $C_3$ and $C_5$ fractions are withdrawn through lines 21 and 22 respectively while the $C_4$ fraction is returned to dehydrogenation zone 10 by way of line 23.

The following example is intended to illustrate the operating conditions which may be successfully employed when conducting the two stage process as previously described.

A $C_4$ fraction feed comprising approximately 40% olefins and 60% paraffins, both normal and iso compounds being present, is dehydrogenated by contacting the vapors with a chromia-aluminia catalyst at a temperature of approximately 1200° F., at an absolute pressure of about 100 mm. of mercury and at a gas hourly space velocity of 300 measured at standard conditions. The resultant products of dehydrogenation are supplied to a separation zone in which butadiene is recovered by a combination of stripping, absorbing and azeotropic distillation. The $C_4$ fraction remaining from the separation step is contacted at a temperature of about 1000° F. with a composite of silica and alumina prepared from the hydrogels of silica and alumina, in order to isomerize the isobutene contained therein to normal butene. The resulting C₄ isomerized fraction is returned to the dehydrogenation zone for further conversion into butadiene.

I claim as my invention:

1. A process for producing butadiene which comprises subjecting normal C₄ hydrocarbons under dehydrogenating conditions to the action of a dehydrogenating catalyst to form butadiene with the accompanying formation of minor amounts of isobutene, separating from the resultant reaction products butadiene and a C₄ fraction containing said isobutene, contacting said C₄ fraction with an olefin isomerizing catalyst to convert the isobutene contained therein into normal butene and supplying the C₄ products of the isomerization treatment to the dehydrogenating step.

2. A process for producing butadiene which comprises subjecting normal butenes under dehydrogenating conditions to the action of a dehydrogenating catalyst to form butadiene with the accompanying formation of minor amounts of isobutene, separating from the resultant reaction products butadiene and a C₄ fraction containing said isobutene, contacting said C₄ fraction with an olefin isomerizing catalyst to convert the isobutene contained therein into normal butene and supplying the C₄ products of the isomerization treatment to the dehydrogenating step.

3. The process of claim 1 further characterized in that said olefin isomerizing catalyst comprises precipitated silica, precipitated alumina and precipitated zirconia.

4. The process of claim 1 further characterized in that said olefin isomerizing catalyst comprises precipitated silica and precipitated alumina.

5. The process of claim 1 further characterized in that said olefin isomerizing catalyst comprises precipitated silica and precipitated zirconia.

6. A process for producing butadiene which comprises subjecting normal C₄ hydrocarbons to the action of a dehydrogenating catalyst comprising alumina and chromia at a temperature of from about 1000° to about 1300° F. and a pressure below 300 mm. of mercury absolute to form butadiene with the accompanying formation of isobutene, separating from the resultant reaction products butadiene and a C₄ fraction containing said isobutene, contacting said C₄ fraction with an olefin isomerizing catalyst comprising silica and alumina under olefin isomerizing conditions to convert the isobutene contained therein into normal butene and supplying the C₄ products of the isomerization treatment to the dehydrogenating step.

7. A process for producing butadiene which comprises subjecting normal C₄ hydrocarbons to the action of a dehydrogenating catalyst comprising alumina and chromia at a temperature of from about 1000° to about 1300° F. and a pressure below 300 mm. of mercury absolute to form butadiene with the accompanying formation of isobutene, separating from the resultant reaction products butadiene and a C₄ fraction containing said isobutene, contacting said C₄ fraction with an olefin isomerizing catalyst comprising silica and zirconia under olefin isomerizing conditions to convert the isobutene contained therein into normal butene and supplying the C₄ products of the isomerization treatment to the dehydrogenating step.

8. In the dehydrogenation of a normal C₄ hydrocarbon to produce butadiene, wherein isobutene is formed incidental to the production of butadiene, the method which comprises separating from the products of the dehydrogenating step a butadiene fraction and a C₄ fraction containing said isobutene, subjecting said C₄ fraction to isomerization to convert isobutene to normal butene, and returning the thus treated C₄ fraction to the dehydrogenating step.

9. The method as defined in claim 8 further characterized in that said C₄ fraction is subjected to isomerization in the presence of a catalyst comprising silica and alumina.

10. The method as defined in claim 8 further characterized in that said C₄ fraction is subjected to isomerization in the presence of a catalyst comprising silica and zirconia.

11. The method as defined in claim 8 further characterized in that said C₄ hydrocarbon is a normal butene.

WILLIAM J. MATTOX.